United States Patent [19]

Plee

[11] Patent Number: 5,173,462

[45] Date of Patent: Dec. 22, 1992

[54] INDUSTRIAL ADSORBENTS BASED ON LOW-SILICA X ZEOLITES, FOR NON-CRYOGENIC SEPARATION OF AIR GASES, AND THEIR MANUFACTURE PROCESS

[75] Inventor: Dominique Plee, Meulan, France

[73] Assignee: Ceca S.A., Courbevoie, France

[21] Appl. No.: 791,680

[22] Filed: Nov. 14, 1991

[30] Foreign Application Priority Data

Nov. 16, 1990 [FR] France .................. 90 14295

[51] Int. Cl.$^5$ .................. B01J 20/12; B01J 20/18
[52] U.S. Cl. .................. 502/67; 502/68
[58] Field of Search .................. 502/67, 68

[56] References Cited

U.S. PATENT DOCUMENTS

| | | | |
|---|---|---|---|
| 3,366,578 | 1/1968 | Michalko .................. | 502/67 |
| 3,634,331 | 1/1972 | Neddenriep .................. | 502/67 |
| 3,773,690 | 11/1973 | Heinze et al. .................. | 502/67 |
| 3,804,747 | 4/1974 | Kimberlin, Jr. et al. .................. | 502/67 |

OTHER PUBLICATIONS

ACS Symposium Ser. 368/ year 1988, pp. 478–497, Molecularly Engineered, High-Performance Adsorbent Self-Bound Low-Silica X Zeolite.

Primary Examiner—Carl F. Dees

[57] ABSTRACT

An industrial shaped adsorbent for the non-cryogenic separation of gases from air, comprising from 70 to 95% by weight zeolites, and, correspondingly, from 30 to 5% by weight of a clay binder, (a) said zeolites consisting essentially of mixtures of X and A zeolites having an X crystallinity greater than or equal to 95% and an A crystallinity less than or equal to 5%, a toleune standard adsorption of 23±1% and an X-ray spectrum characteristic of a practically pure faujasite, and with the Si/Al ratio of the crystalline component being 1±0.03, and (b) with the adsorbent having a 2Ca/Al ratio between about 80 and 99%, a nitrogen adsorption between 16 and 23.5 L/kg and a ratio of the nitrogen to the oxygen adsorption capacities under 1 bar between 3.5 and 4.5 and the process of making such adsorbents.

11 Claims, No Drawings

INDUSTRIAL ADSORBENTS BASED ON LOW-SILICA X ZEOLITES, FOR NON-CRYOGENIC SEPARATION OF AIR GASES, AND THEIR MANUFACTURE PROCESS

BACKGROUND OF THE INVENTION

The present invention pertains to low-silica X zeolite industrial adsorbents which are particularly effective for the non-cryogenic separation of gases from air.

The separation of gases from air with faujasite has been envisaged practically since the synthesis of the zeolites was made possible (notably, Milton's studies) without the calcic faujasites having been shown to have a particular industrial value for this purpose.

The faujasites constitute a group of mineral species characterized by their crystallographic topographic structure. This topic received excellent coverages in the book by Donald W. Breck "Zeolite Molecular Sieves", John Wiley and Sons, 1974, p. 92 ff. Lowenstein's law requires an Si/Al ratio greater than or equal to 1. It is customary to distinguish:

(i) the X faujasites with Si/Al<1.5, and
(ii) the Y faujasites with Si/Al>1.5.

However, the conventional X faujasites have an Si/Al ratio $\leq 1.2$. The physical characteristics of faujasites (exchange capacity, nitrogen adsorption, etc.) evolve in relation to the Si/Al ratio, and the traditional methods for producing X faujasites are not successful for the preparation of zeolites with an Si/Al ratio close to 1. Specifically, from a purely sodium medium, NaA zeolite is produced and it is necessary to introduce a certain amount of potassium ions in order to synthesize the faujasite structure. The synthesis of such zeolites with an Si/Al ratio=1 was described in British Patent No. 1,580,928.

The functional characteristics required for an adsorbent for the non-cryogenic separation of gases from air are the following:

(i) a high nitrogen adsorption capacity, and
(ii) a large difference between the nitrogen adsorption capacity and the oxygen adsorption capacity.

Industrial adsorbents for the separation of gases from air are characterized by their adsorption of nitrogen at 25° C. under 1 bar [$C_{N2}$], expressed in liters (TNP) of nitrogen adsorbed per kilogram of adsorbent, and by the ratio of the nitrogen to the oxygen adsorption capacities [$\alpha_{N2/O2}$] under 1 bar. These capacities are measured using techniques, which are well known by those skilled in this art, in an apparatus under vacuum either gravimetrically or volumetrically after degassing under vacuum.

The adsorbents which have been attainable industrially until now are characterized by a nitrogen adsorption capacity [$C_{N2}$] of at most 13 liters/kg and an adsorption selectivity [$\alpha_{N2/O2}$], ratio of the respective nitrogen and oxygen adsorption capacities, of circa 3. These values are for agglomerates with an X zeolite level of circa 80% or sieves without binder with an X zeolite level of circa 80%.

SUMMARY OF THE INVENTION

It has now been found that it is possible to provide very noticeably improved industrial adsorbents formed in shapes containing from 70 to 95% zeolites and from 5 to 30% of a clay binder, which zeolites are essentially mixtures of X and A zeolites having an X crystallinity greater than or equal to 95% and an A crystallinity less than or equal to 5%, a toluene adsorption (standard adsorption with a partial pressure of 0.5 and at a temperature of 25° C.) of $23\pm1\%$ and an X-ray spectum characteristic of a practically pure faujasite, with the Si/Al ratio of the crystalline component being $1\pm0.03$, and with the product also being characterized by a 2Ca/Al ratio between circa 80 and 99%, a nitrogen adsorption between 16 and 23.5 L/kg and a ratio of the nitrogen to the oxygen adsorption capacities under 1 bar between 3.5 and 4.5

The invention also comprises the method of making such adsorbents.

DETAILED DESCRIPTION

The preferred products in accordance with the invention are particularly those products with a 2Ca/Al ratio equal to 0.85 and a nitrogen adsorption capacity at 25° C. under 1 bar of 19 liters/kg$\pm 1$, and those products with a 2Ca/Al ratio equal to 0.95 and a nitrogen adsorption capacity at 25° C. under 1 bar of 22 liters/kg$\pm 1$.

Such industrial adsorbents are novel. For this purpose, it is possible to make a distinction between the X faujasites as mineralogical species, which for research purposes can be formulated in limited quantities in different physical forms, and the industrial adsorbents containing these faujasites, which are produced by manufacturing procedures in the large quantities compatible with the needs of units for the separation of gases from air. It is known that zeolite adsorbents, particularly those based on calcic faujasites, exhibit characteristics which distance them considerably from the mineralogical species that they supposedly contain. These facts have been reported, notably in European Patents EP 164024, 196103 and 109063, which attribute to the industrial adsorbents a structure of their zeolitic component containing the majority of their Ca ions in a hydrated and/or hydroxylated state. This information is very appealing, but the corresponding publications do not present any experimental verification of this hypothesis nor do they provide any general information for attaining this dehydrated/dehydroxylated state of the calcium ion of the structure except for limiting the hydric environment of the zeolite during activation, restrictions which are known by researchers and which limit them to the production of calcic faujasites as simple mineralogical species. For this purpose, it is recommended that careful dehydration of the zeolites be performed prior to their activation, e.g., using a very specific thermal program of gas-phase chromatography columns.

The present invention proposes a method for producing the desired adsorbents, which comprises subjecting the result of sodium/calcium exchanges applied to X zeolites with an Si/Al ratio equal to 1 or very close to 1 so as to attain high exchange rates between 80 and very close to 100%, which methods are very well known by those skilled in this art, and of activating them in traversable-bed columns (referred to in French and herein as "LTC"; an acronym for "Lit Traversé Continu"). For this purpose, a homogeneous bed is prepared of granules of the said zeolite in hydrated form, and a stream of non-acidic, preferably decarbonated, dry gas is forced through this bed at a rate which has been made uniform by any known suitable means. The zeolites activated in this manner are then removed and packaged in a manner such as to be protected from ambient air. Specifically, the bed is comprised of agglomerates initially at a temperature below 150° C. and containing from 70 to 95% of a hydrated calcic faujasite and from 5 to 30% of a clay binder. A stream of non-acidic dry gas is injected at a temperature between 300° and 700° C. for at least the time required for the outlet gas to reach approximately its inlet temperature.

In a preferred implementation of the invention, the activation is performed in a metal cylinder which is closed at the bottom by a grate and which is filled in a uniform manner, in accordance with the methods well known by the expert in the field for the attainment of homogeneous filling, with the sieve to be activated in granule form. A stream of hot gas is forced either from top to bottom or from bottom to top. In the case of very thick beds installed in large-diameter columns, distributors are installed such that from the beginning of the column the flow of gas is as uniform as possible. The advance of the thermal front can be monitored, e.g., by means of thermocouples placed at different levels. After the maximum desired temperature (i.e., approximately the temperature to which the scavenging gas was preheated) has been reached at the bed outlet, the operation is continued for another 5 to 60 minutes to complete the dehydration of the zeolite and especially to assure the hardening of the granule binder. The zeolite is then removed, cooled and packaged without contact with the ambient, e.g., under a stream of dry nitrogen. The procedure can be performed in a discontinuous manner in an installation in which the traversable bed is contained in a fixed column. The procedure can also be performed in a continuous manner in a moving (non-fluidized) bed column in which the granules to be activated are introduced at the head of a vertical column and traverse the same without any substantial change in their relative position in the mass of granules while the hot activation gas is injected at the base of the column by means of a suitable device, with the activated agglomerates being extracted and cooled to a temperature of circa 80° C. in an automatic discharge hopper and then packaged immediately.

The invention will be further described in connection with the following examples which are set forth for purposes of further illustration.

EXAMPLE 1

Synthesis of a zeolite with an Si/Al ratio=1 of gel of composition

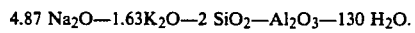

$4.87\ Na_2O - 1.63\ K_2O - 2\ SiO_2 - Al_2O_3 - 130\ H_2O$.

After mixing the reactants sodium silicate and sodium-potassium aluminate with a turbine, the gel was allowed to ripen at 50° C. for about 20 hours and then crystallization was carried out at 100° C. for 4 hours without agitation.

The crystals obtained after filtration and washing were identified by X-ray diffraction as faujasites (i.e., as cubic structures constituted by sodalite cages connected by hexagonal prisms—cf. the cited reference by Breck). Chemical analysis of the solid showed an Si/Al ratio of 1.01 and a standard toluene adsorption capacity at 25° C. of 22.5%.

Calcium chloride exchange was then performed under the following conditions:

(i) concentration of zeolite=135 g/L,
(ii) concentration of $Ca^{2+}$ ions=1.8 M/L,
(iii) temperature=70° C., and
(iv) duration=1 hour.

The exchange was repeated once under the same conditions. The finished product had an exchange rate of 87% (for informational purposes, the Na/K ratio of the residual alkalis was 2).

The product was preformed in the shape of 1.6-mm pellets with 20% binder. The binder was selected from among the clay materials: kaolin, montmorillonite, attapulgite, and the like.

The product was then dried. In the laboratory environment, drying is performed at temperatures below 100° C., preferentially around 90° C., whereas drying is usually performed at around 120° C. in the industrial environment.

EXAMPLE 2

Adsorption characteristics of the zeolite in accordance with Example 1

An adsorbent pelletized in accordance with Example 1 using a 50/50 mixture of attapulgite and montmorillonite and then dried at circa 80° C. was degassed under vacuum at 350° C. during one night in a Mac Bain balance device so as to determine its nitrogen and oxygen adsorption properties at 25° C.

The results showed a $N_2$ adsorption capacity under 1 bar of 27.8 mg/g of zeolite, i.e., 22.2 liters/kg, and an oxygen adsorption capacity of 9 mg/g of zeolite, i.e., 6.3 liters/kg. These characteristics are those that could be attributed to a quasi-theoretical faujasite diluted for handling purposes with 20% of inert material.

EXAMPLE 3

Comparison between the product of Example 2 and a calcium X zeolite with an Si/Al ratio of 1.25

This zeolite was produced under exchange conditions which were slightly different from those of Example 1 (lower concentration of calcium chloride) so as to thereby obtain an exchange rate of 87%.

After degassing under the conditions of Example 2, its $N_2$ adsorption capacity under 1 bar was 22 mg/g of zeolite, i.e., 17.6 liters/kg, and its oxygen adsorption capacity was 7.1 mg/g of zeolite, i.e., 5 liters/kg. Here again, this product had the characteristics of a mineralogical species diluted with 20% of inert binder.

EXAMPLE 4

Using the gel of Example 1 under the same crystallization conditions, a zeolite with an Si/Al ratio=1 was prepared, but in this case it was subjected to three calcium exchange operations with a $Ca^{2+}$ solution (1.8M) which brought it to an exchange rate of 96%. After agglomeration and degassing under vacuum under the conditions of Example 2, the resultant product had nitrogen and oxygen adsorption capacities under 1 bar at 25° C., respectively, of 29.1 mg/g of zeolite, i.e., 23.3 liters/kg, and of 9.4 mg/g of zeolite, i.e., 6.6 liters/kg.

EXAMPLE 5

Industrial calcic zeolite adsorbent with an Si/Al ratio=1

10 kg of the zeolitic agglomerate in accordance with Example 2 (calcic faujasite exchanged at 86%, with an Si/Al ratio=1, containing 20% binder) was activated in a traversable bed (TBC) under dry decarbonated air with a flow rate, in empty column equivalent, of circa 0.3 m/s. The temperature of the gas was 570° C. and the $CO_2$ content was less than 1 ppm.

The nitrogen and oxygen adsorption capacities were measured after degassing under vacuum of the TBC-activated product. The following values were found under 1 bar at 25° C. for $N_2$ and $O_2$, respectively: 22.7 mg/g of zeolite, i.e., 18.2 liters/kg, and 6.8 mg/g of zeolite, i.e., 4.8 liters/kg.

EXAMPLE 6

Comparative test versus an industrial calcic zeolite adsorbent with an Si/Al ratio = 1.25

The zeolite of Example 3 with an Si/Al ratio = 1.25 was subjected to the activation treatment of Example 5. After degassing under vacuum, the resultant product had nitrogen and oxygen adsorption capacities under 1 bar at 25° C., respectively, of 18.1 mg/g of zeolite, i.e., 14.5 liters/kg, and 5.6 mg/g of zeolite, i.e., 3.9 liters/kg.

EXAMPLE 7

Comparative Example

It was attempted to produce a faujasite zeolite with an Si/Al ratio = 1 and with a calcium exchange rate of circa 87% by activation of the corresponding agglomerate with 20% of kaolin in a traditional industrial rotary furnace. The product obtained after a furnace residency time of circa 60 minutes at 550° C. was characterized by a nitrogen adsorption capacity of 9.4 mg/g, i.e., 7.5 liters/kg. On the basis of these characteristics it was in no way possible to consider the product to be a calcic faujasite in accordance with Example 2 nor an industrial adsorbent in accordance with the invention of Example 5.

EXAMPLE 8

Calcic faujasite agglomerates with the same calcic exchange rate, but with Si/Al ratios ranging from 1.25 to 1, and activated comparatively in a rotary furnace and in a TBC furnace were tested for nitrogen adsorption capacity. The results are set for in the table below.

| Si/Al RATIO = 1 | | Si/Al RATIO = 1.25 | |
|---|---|---|---|
| Rotary furnace | LTC column | Rotary furnace | LTC column |
| 7.5 L/kg | 18.2 L/kg | 6 L/kg | 24.5 L/kg |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An industrial shaped adsorbent for the non-cryogenic separation of gases from air, comprising from 70 to 95% by weight zeolites and, correspondingly, from 30 to 5% by weight of a clay binder,
    (a) said zeolites consisting essentially of mixtures of anhydrous X and A zeolites having an X crystallinity greater than or equal to 95% and an A crystallinity less than or equal to 5%, a tolune standard absorption of 23±1% and an X-ray spectrum characteristic of a practially pure faujasite, and with the Si/Al ratio of the crystalline component being 1±0.03, and
    (b) said zeolites having a 2Ca/Al ratio between about 80 and 99%, and
    (c) with the adsorbent having a nitrogen adsorption between 16 and 23.5 L/kg and a ratio of the nitrogen to the oxygen adsorption capacities under 1 bar between 3.5 and 4.5.

2. The industrial shaped adsorbent of claim 1, said zeolites having a 2Ca/Al ratio equal to 0.85 and said adsorbent having a nitrogen adsorption capacity at 25° C. under 1 bar of 22 liters/kg±1.

3. The industrial shaped adsorbent of claim 2, said zeolites having a 2Ca/Al ratio equal to 0.95 and said adsorbent having a nitrogen adsorption capacity at 25° C. under 1 bar of 22 liters/kg±1.

4. A process for the production of industrial pelletized adsorbents for the non-cryogenic separation of gases from air, which adsorbents contain between 70 and 95% by weight zeolites and, correspondingly, 30 and 5% by weight of a clay binder, the said zeolites being essentially mixtures of X and A zeolites having an X crystallinity greater than or equal to 95% and an A crystallinity less than or equal to 5%, a toluene standard adsorption of 23±1% and an X-ray spectrum characteristic of a practically pure faujasite with the Si/Al ratio of the crystalline component being 1±0.03, with the adsorbents having a 2Ca/Al ratio between circa 80 and 99%, a nitrogen adsorption between 16 and 23.5 L/kg and a ratio of the nitrogen to the oxygen adsorption capacities under 1 bar between 3.5 and 4.5, the process comprising subjecting the adsorbent containing the corresponding hydrated calcic zeolite to activation in a traversable bed, which activation is comprised of forcing a stream of non-acidic dry gas injected at a temperature between 300° and 700° C. through a bed of the said agglomerates initially at a temperature below 150° C. for at least the period of time required for the outlet gas to reach approximately its inlet temperature, with the adsorbent activated in this manner than being removed and packaged without exposure to the ambient air.

5. The process of claim 4, wherein the traversable bed is a fixed bed.

6. The process of claim 4, wherein the traversable bed is a moving bed.

7. The process of claim 4, wherein the gas injected is a decarbonated gas.

8. The process of claim 5, wherein the gas injected is a decarbonated gas.

9. The process of claim 6, wherein the gas injected is a decarbonated gas.

10. As a new product, the industrial shaped adsorbents prepared in accordance with the process of claim 4.

11. As a new product, the industrial shaped adsorbents prepared in accordance with the process of any one of claims 5 to 9.

* * * * *

UNITED STATES PATENT AND TRADEMARK OFFICE
CERTIFICATE OF CORRECTION

PATENT NO. : 5,173,462
DATED : December 22, 1992
INVENTOR(S) : Plee, Dominique

It is certified that error appears in the above-indentified patent and that said Letters Patent is hereby corrected as shown below:

Column 1, line 26, "$\leq$" should be --$\geq$--.

Signed and Sealed this

Nineteenth Day of October, 1993

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,173,462
DATED : December 22, 1992
INVENTOR(S) : Dominique Plee

It is certified that error appears in the above-indentified patent and that said Letters Patent is hereby corrected as shown below:

On the Title page, item [56] "OTHER PUBLICATIONS" insert the following:

EPA 0,109,063
EPA 0,164,024
EPA 0,196,103

Signed and Sealed this

Seventeenth Day of May, 1994

Attest:

BRUCE LEHMAN

Attesting Officer

Commissioner of Patents and Trademarks